April 24, 1928.
F. SAWYER
1,667,131
ANNUNCIATOR FOR TAXIMETERS
Filed Oct. 12, 1923
2 Sheets-Sheet 1
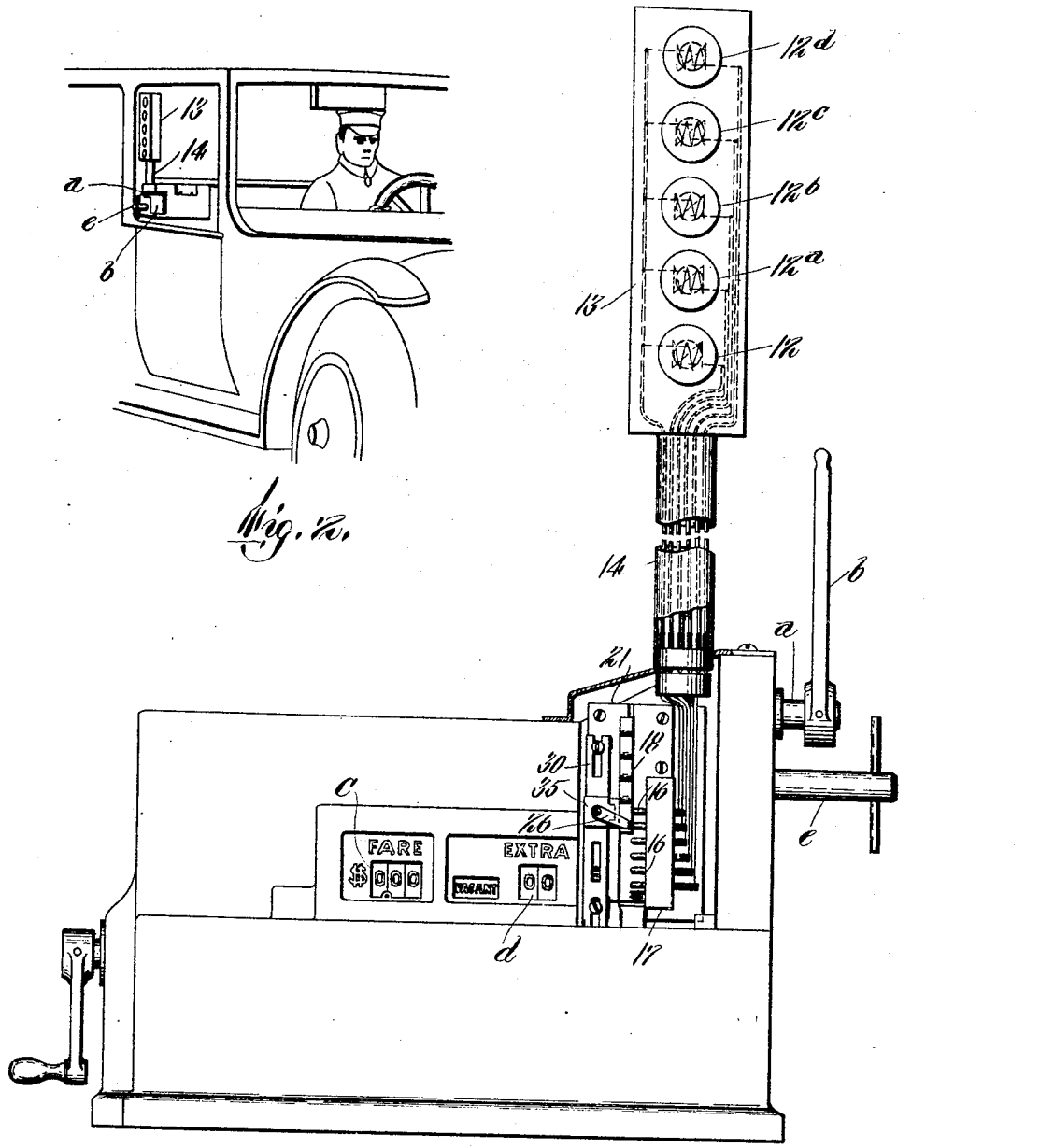

April 24, 1928.
F. SAWYER
1,667,131
ANNUNCIATOR FOR TAXIMETERS
Filed Oct. 12, 1923    2 Sheets-Sheet 2
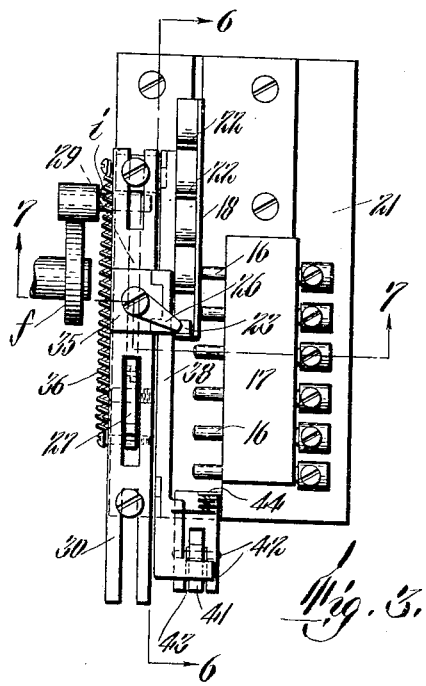
Inventor:
Frank Sawyer,
by Wright Brown Quinby May
Attys.

Patented Apr. 24, 1928.

1,667,131

UNITED STATES PATENT OFFICE.

FRANK SAWYER, OF BOSTON, MASSACHUSETTS, ASSIGNOR TO OHMER FARE REGISTER COMPANY, OF DAYTON, OHIO, A CORPORATION OF NEW YORK.

ANNUNCIATOR FOR TAXIMETERS.

Application filed October 12, 1923. Serial No. 668,164.

The object of this invention is to provide, as an adjunct of a taximeter, an annunciator adapted to conspicuously show to a person outside the vehicle in which the meter is installed, a number of passengers registered by the usual mechanism operated by the driver, so that the observer, who may be an inspector, will be enabled by comparing the rearing of the annunciator with the number of passengers seen in the vehicle, to ascertain if the driver has correctly registered the number of passengers.

I attain this object by the construction hereinafter described and claimed.

Of the accompanying drawings forming a part of this specification,—

Figure 1 is a front elevation of an annunciator embodying the invention, applied to a taximeter.

Figure 2 is a perspective view, showing the taximeter and annunciator installed in a vehicle.

Figure 3 is a front elevation showing the signal-operating mechanism on a larger scale.

Figure 4 is an edge view of the mechanism shown by Figure 3.

Figure 5 is an end view of the mechanism shown by Figures 2 and 3.

Figure 6 is a section on line 6—6 of Figure 3.

Figure 7 is a section on line 7—7 of Figure 3.

Figure 8 is a diagrammatic view, showing the circuit connections.

The same reference characters indicate the same parts in all the figures.

I have shown the annunciator of my invention applied to a taximeter of well known construction, including a flag shaft $a$ carrying a flag-shaped arm $b$, which is in a raised position when the vehicle is unoccupied, and is swung downward after the occupancy of the vehicle, to turn the flag-shaft and render the mechanism of the taximeter operative, so that the amount due at the end of the trip is indicated by a register at $c$ (Figure 1). The movement of the flag-shaft causes the register at $d$ (Figure 1), to indicate the presence of one passenger.

The taximeter includes a manually operable registering member which, in this instance, is a shaft $e$ adapted to be rotated by the driver, each rotation of the registering shaft causing the register at $d$ to indicate the presence of another passenger. If there are five passengers, it is the duty of the driver to turn the registering shaft $e$ four times, so that a total of five passengers is registered.

The annunciator is operable by successive rotations of the registering shaft to indicate at an exposed point on the vehicle the number of movements of the registering shaft made by the driver in registering the number of passengers, so that an inspector looking at a passing taxicab equipped with the annunciator, is enabled by comparing the annunciator with the number of passengers seen by him in the vehicle, to ascertain whether the driver has properly operated the registering shaft or not.

The indicator 13 includes a plurality of visible signals, which, in this instance, are incandescent electric lamps 12, enclosed in a casing, which is suitably supported on the vehicle. The casing is here shown as supported by a tube 14, fixed at its lower end to the casing of the meter, and at its upper end to the indicator 13, the arrangement being such that the annunciator may be plainly seen by an inspector outside the vehicle.

The lamps 12 are connected in parallel, so that they may be successively lighted, as hereinafter described, the order in which the lamps, after the first of the series, are lighted, being indicated by exponents, as "a," "b," "c," "d," accompanying the reference numerals 12, in Figures 1 and 8.

I provide means operable by the movements of the registering shaft or member $e$ to render the annunciator signals successively active, so that the number of passengers registered by the driver may be indicated to an inspector outside the vehicle and compared with the number seen in the vehicle.

In the preferred embodiment of the invention here shown, the signals or lamps 12 are connected by the wiring shown diagrammatically by Figure 8, with a source 15 of electrical energy, and with a series of contacts 16, mounted in a fixed holder 17, of insulating material. The contacts 16 are in the path of an elongated sliding circuit closer 18 of conducting material, so guided that it is adapted to electrically connect two or any other number of contacts 16, and thus render one or any other number of signals active. When the circuit closer 18 is in the position shown by full lines in Figure 8, the first signal 12 is active, and when the circuit closer is moved to the dotted line position, all of the signals are active.

The circuit closer 18 is moved step-by-step, to cause it to cooperate, as described, with the contacts 16, by connections between the circuit closer and the registering shaft member $e$.

The meter here shown includes a cam $f$, (Figs. 3 and 4) which is rotated by the rotation of the registering shaft $e$ through connections between the shaft and cam, such as the intermeshing gears $f'$, $f^2$ shown by dotted lines in Figure 4, one of said gears being fixed to the shaft, and the other to the cam, so that the cam turns in unison with the shaft, and is an element of the usual mechanism of the meter. Other elements of said mechanism are a rocker-arm $g$, supported by the cam, as shown by Figure 4, and vertically oscillated by the rotation of the cam. Said rocker-arm is pivoted at $h$ and is provided at its free end with a pin or stud $i$, which is raised and lowered when the cam is rotated.

It is unnecessary to describe the function of the mechanism which includes the parts $f$, $g$ and $h$, further than to state that the part or cam $i$ is an element which imparts, through the means next described, a step-by-step movement to the circuit closer 18, when the registering shaft $e$ and the cam $f$ are rotated by the driver.

The circuit closer 18 is slidable in guides 19 (Figure 7) on a fixed holder 21, and is provided with a series of notches 22 (Figure 3). A pawl 23 (Figures 5 and 7) is actuated by a spring 26 to engage either notch, when the pawl is reciprocated by connections between it and the cam $i$. Said connections include a lever 27 (Figure 4) pivoted at 28 to the holder 21, a link 29 connecting one end of the lever with the stud $i$, and an elongated slide 30, vertically movable on the holder 21, and provided with a pin 32, engaged with a slot 33 in the lever 27. The pawl 23 is pivoted at 34 to a block 35, which is fixed to the slide 30. The lever 27, oscillated by the cam $f$ and rocker-arm $g$, alternately depresses the slide 30, and permits it to be raised by a spring 36, so that the pawl 23 is vertically reciprocated. When the pawl rises, it slips on the circuit closer 18 from one notch 22 to the next higher notch, and when the pawl descends, its engagement with a notch 22 causes it to move the circuit closer downward one step.

To permit the circuit closer to be restored to its initial position I provide means for moving the pawl slightly outward during the upward movement of the circuit closer so that the pawl will not interfere with such upward movement. Extending behind the pawl is an elongated bar 38 the ends of which are connected by links 39 with blocks 40 secured to the holder 21, so that the rod is movable sidewise toward and from the holder, as indicated by full and dotted lines in Fig. 6. The usual mechanism of the meter includes a slide member $j$, the primary function of which need not be described, it being sufficient to say that this member is raised by the action of the printing crank, which is actuated only when the passenger is discharged. I utilize the member $j$ to impart sidewise movement to the bar 38, thus causing the bar to engage the pawl and move the same outwardly, thereby releasing the circuit closer and permitting the same to be raised. Cooperating with the member $j$ is a curved lever 41 pivoted at 42 to ears carried by the holder 21. One arm of the lever enters a slot 43 (Fig. 3) in the bar 38 and is forced against the lower end of the bar by the upward movement of the member $j$, thus moving the bar and the pawl outward and releasing the circuit closer. A spring 44 (Fig. 3 normally urges the bar 38 into the full line position shown in Fig. 6.

In operation, the parts are in the position shown in Fig. 4 when the taxicab is hired. The operator rotates the flag $b$ ninety degrees so that the meter mechanism including the extras knob $e$ may be operated. If there is only one passenger the extras knob $e$ is not rotated but it is actuated one revolution for each extra passenger carried. Each time that the extras knob $e$ is rotated the cam $f$ is rotated and causes reciprocatory movement to be imparted to the slide 30 by means of the rocker arm $g$, link 29, lever 27 and the pin and slot connection 32—33, the pin serving as the means to lower the slide 30 and the spring 36 serving as a means to elevate the same. As the slide 30 moves downward the pawl 23 engages one of the notches 22 in the circuit closer 18 and lowers the circuit closer a distance equal to the space between two notches. The spring contacts 16 have resilient contact with the circuit closer 18 and resist any tendency of the circuit closer to move upward with the pawl when the latter is retracted. When the end of the journey is reached the driver moves the flag $b$ to its lowermost position in which it will hang straight downward or one hundred and eighty degrees from the position shown in Fig. 1. This is necessary so that the printing crank shown at the extreme left of Fig. 1 may be actuated. When the printing crank is actuated the sliding member $j$ is moved upwardly until it strikes the lever 41, thus moving the bar 38 into the dotted line position shown in Fig. 6, the bar being moved outwardly by means of the links 39, and thereby moving the pawl 23 out of engagement with the notches 22 on the circuit closer 18. As the member j continues to move upwardly the upper end thereof strikes against the pin 45 carried by the circuit closer 18 and elevates the circuit closer into the position shown in Fig. 3. The sliding member j now descends leaving the parts in the position shown in Fig. 3.

I claim:

1. In combination, a taximeter which includes a manually movable registering member, operable by a driver to register the number of passengers on board on a given trip; an annunciator including a plurality of normally inactive signals corresponding in number to the number of passenger seats in a vehicle, and means operable by the movements of said registering member to render said signals successively active, the arrangement being such that the number of passengers registered by the driver may be indicated to an inspector outside the vehicle, and compared with the number seen in the vehicle.

2. In combination, a taximeter which includes a manually movable member operable by a driver to register the number of passengers on board on a given trip; an annunciator including a plurality of normally inactive electric lamps corresponding in number to the number of passenger seats in a vehicle, a series of fixed contacts in circuit with said lamps, a movable circuit closer adapted to cooperate with said contacts in closing the circuit through any number of said lamps, and connections between said registering member and said circuit closer adapted to move the latter step-by-step.

3. In combination, a taximeter which includes a manually movable member operable by a driver to register the number of passengers on board on a given trip; an annunciator including a plurality of normally inactive electric lamps corresponding in number to the number of passenger seats in a vehicle, a series of fixed contacts in circuit with said lamps, a movable circuit closer adapted to cooperate with said contacts in closing the circuit through any number of said lamps, said circuit closer being provided with spaced apart notches, a pawl movable beside the circuit closer and adapted to engage said notches, and connections between the pawl and the said registering member adapted to reciprocate the pawl and move the circuit closer step-by-step.

4. In combination, a taximeter which includes a manually movable member operable by a driver to register the number of passengers on board on a given trip; an annunciator including a plurality of normally inactive electric lamps corresponding in number to the number of passenger seats in a vehicle, a series of fixed contacts in circuit with said lamps, a movable circuit closer adapted to cooperate with said contacts in closing the circuit through any number of said lamps, said circuit closer being provided with spaced apart notches, a pawl movable beside the circuit closer and adapted to engage said notches, and connections between the pawl and the said registering member adapted to reciprocate the pawl and move the circuit closer step-by-step, means being provided for separating the pawl from the circuit closer during the retracting movement of the pawl.

5. The combination with a registering device for a passenger vehicle which includes a manually movable registering member operable by the driver to register the number of passengers entering the vehicle, an indicator comprising a plurality of normally inactive electric signals, a series of fixed contacts in circuit with the respective signals, a contact member movable into engagement with any desired number of fixed contacts to close the circuits through the selected signals, and means controlled by the movement of said registering member to cause said movable contact member to close the circuits through signals corresponding to the number of passengers registered.

6. The combination with a taximeter comprising a registering device, and means for actuating the same, of an indicator having a plurality of designations corresponding to items to be registered on said registering device, separate electrically controlled means for exposing to view the respective designations of said indicator, each comprising a circuit, a circuit breaker and closer comprising a member having contacts connected with the respective circuits, and a second contact member connected with said circuits and arranged to successively engage the first mentioned contacts, one of said members being operatively connected with said registering device to cause the circuits to be closed through one or more of said designations according to the registrations on said registering device.

7. The combination with a taximeter comprising a registering device, and means to actuate the same, of an indicator having a plurality of designations corresponding to items to be registered on said registering device, separate electrically controlled means for exposing to view the respective designations of said indicator, each comprising a circuit, and means associated with said registering device for selectively controlling said circuits to expose to view a number of designations corresponding to the registrations on said registering device.

8. The combination with a taximeter comprising a registering device, and an actuating device to advance said registering device one unit upon each operation of said actuating device, of an electrically controlled indicator having a plurality of designations corresponding to items to be registered on said registering device, separate circuits to control the respective designations, and means controlled by said registering device to cause one of said circuits to be closed upon the first operation of said registering device and to cause an additional circuit to be closed upon each succeeding operation of said registering device.

In testimony whereof I have affixed my signature.

FRANK SAWYER.